Oct. 30, 1962 H. WYLE 3,061,672

RUN LENGTH ENCODER

Filed July 25, 1960 6 Sheets-Sheet 1

INVENTOR
HENRY WYLE

BY Borst and Borst
ATTORNEYS

INVENTOR
HENRY WYLE
BY Bertram Bertram
ATTORNEYS

Oct. 30, 1962 H. WYLE 3,061,672

RUN LENGTH ENCODER

Filed July 25, 1960 6 Sheets-Sheet 4

Oct. 30, 1962 H. WYLE 3,061,672

RUN LENGTH ENCODER

Filed July 25, 1960 6 Sheets-Sheet 5

INVENTOR
HENRY WYLE

BY Brown and Brown
ATTORNEYS

Fig. 7.
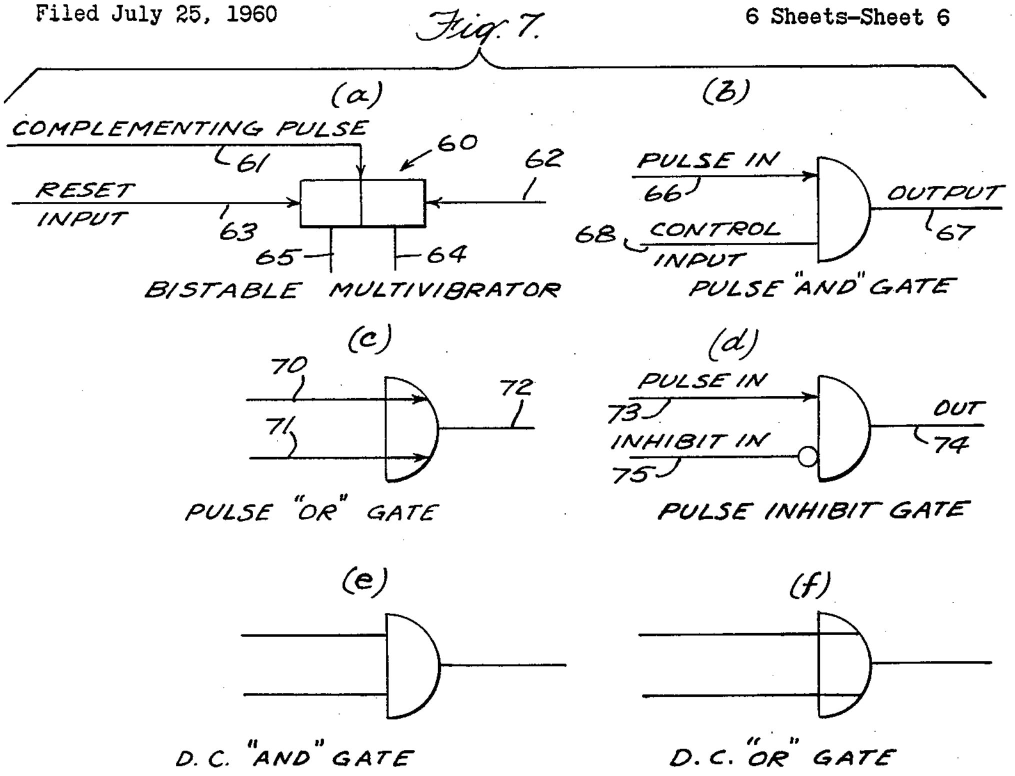
Fig. 8.
| RUN LENGTH (AREA ELEMENTS) | ADDRESS | REMAINDER | CODE WORD LENGTH (BITS) |
|---|---|---|---|
| 1 | 0 | 00 | 3 |
| 2 | 0 | 01 | 3 |
| 3 | 0 | 10 | 3 |
| 4 | 0 | 11 | 3 |
| 5 | 10 | 00 | 4 |
| 6 | 10 | 01 | 4 |
| 7 | 10 | 10 | 4 |
| 8 | 10 | 11 | 4 |
| 9 | 110 | 000 | 6 |
| 10 | 110 | 001 | 6 |
| 16 | 110 | 111 | 6 |
| 32 | 1110 | 1111 | 8 |
| 64 | 11110 | 11111 | 10 |
| 128 | 111110 | 111111 | 12 |
| 256 | 1111110 | 1111111 | 14 |
| 512 | 11111110 | 11111111 | 16 |
| 1024 | 111111110 | 111111111 | 18 |
| 1152 | 111111111 | 0001111111 | 19 |
| MARGIN | 111111111 | 1111111111 | 19 |
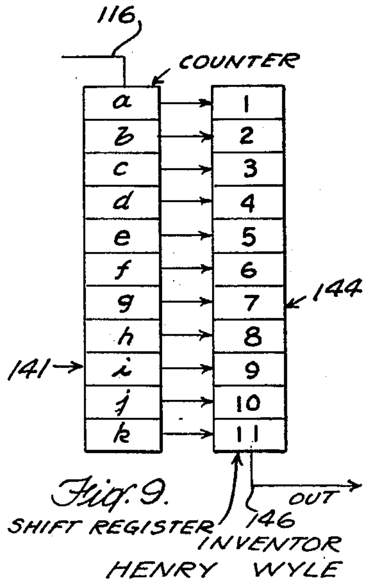
Fig. 9.
INVENTOR
HENRY WYLE
BY Bozst and Bozst
ATTORNEYS United States Patent Office 3,061,672
Patented Oct. 30, 1962

3,061,672
RUN LENGTH ENCODER
Henry Wyle, Flushing, N.Y., assignor to Sperry Rand Corporation, Ford Instrument Company Division, Wilmington, Del., a corporation of Delaware
Filed July 25, 1960, Ser. No. 44,950
10 Claims. (Cl. 178—7.1)

This invention relates to a coding system for black and white picture transmission over wire or radio communication systems. The invention has particular reference to a reduced-time transmission system wherein large areas of black or white are scanned and transmitted with a "length-of-run" code.

Conventional picture transmission includes the conversion of the scanned information in the picture into a time varying electrical signal. This signal is transmitted over wire lines or broadcast as radio signals. After transmission, the signal is reproduced on a surface by converting the signals into a visual picture by any one of a number of transducers designed to produce a positive or negative picture.

The conversion of the picture into an electrical signal generally consists of optically scanning the picture at a constant rate over a more or less rectangular raster. Since the information is, in general, not uniformly spread over its surface, the rate at which the scanner presents information to the transmission channel varies with time and sometimes a complete scanning line may consist of a single information bit, white or black. For this reason, it is evident that the conventional facsimile system does not fully utilize the capacity of its transmission channel, and that an increase in speed of transmission of such information is possible.

The present invention scans the picture by a series of lines filling a rectangular area. An optical light-sensitive transducer converts the sensed lines into a series of voltage pulses and presents these pulses to an encoding circuit. The encoding circuit measures the time duration (length-of-run) of each voltage pulse, and assigns a binary code to the pulse. Because of a limit of resolution, which always exists, the picture to be transmitted may be treated as an aggregate of small resolution elements, and to transmit a voltage pulse for each element would correspond to a quantized version of conventional transmission methods, and would require approximately the same information transmission rates.

The "Run Length Coding" system divides the copy into small resolution elements as before but, for any length of all white (or all black) the system uses a particular code word, the meaning of which relates to the length of the run sensed by the photoelectric transducer. If the white lines (or solid black lines) are long, a considerable saving in time results. Binary code symbols are employed and these reduce the time of transmission by a considerable amount.

One of the objects of this invention is to provide an improved encoding system which accepts information regarding the nature of a sensed area in a picture to be transmitted and the length of the sensed line wherein the shade does not change.

Another object of the invention is to reduce the time of transmission of a picture area so that black and white maps, line drawings and typed copy can be transmitted quickly and efficiently over the usual channels of communication.

Another object of the invention is to generate voltage pulses having their start and stop times proportional to the start and stop characteristics of the picture transmitted. The variable amplitude characteristics of the pulses during and after transmission through a communication system have no bearing on the resultant picture.

The invention includes a means for scanning an area of intelligence with a light sensitive transducer which produces electrical scanning indicative of black or white areas. A plurality of multivibrator circuits are connected to the scanning means for converting the scanning signals into a code which contains information regarding the time duration of each black and white scanned area. In order to count the duration of the signals, a synchronized timing pulse generator is provided for controlling the multivibrator circuits, this generator producing a series of four sequential timing pulses from a ring counter circuit. The generated code is applied to a storage shift register which includes a plurality of storage circuits where the coded pulses are stored, and a gating means is provided for applying the contents of the storage shift register to an output circuit for transmission to other utilization circuits.

For a better understanding of the present invention, together with other and further objects thereof, reference is made to the following description taken in connection with the accompanying drawings.

FIG. 7 is a collection of symbols used in FIGS. 3, 4, 5 and 6 to indicate gates and multivibrators.

FIG. 8 is a chart showing the run length code, each code word having an address and a binary remainder.

FIG. 9 is a simplified diagram of the counter and shift register.

Figure 1:
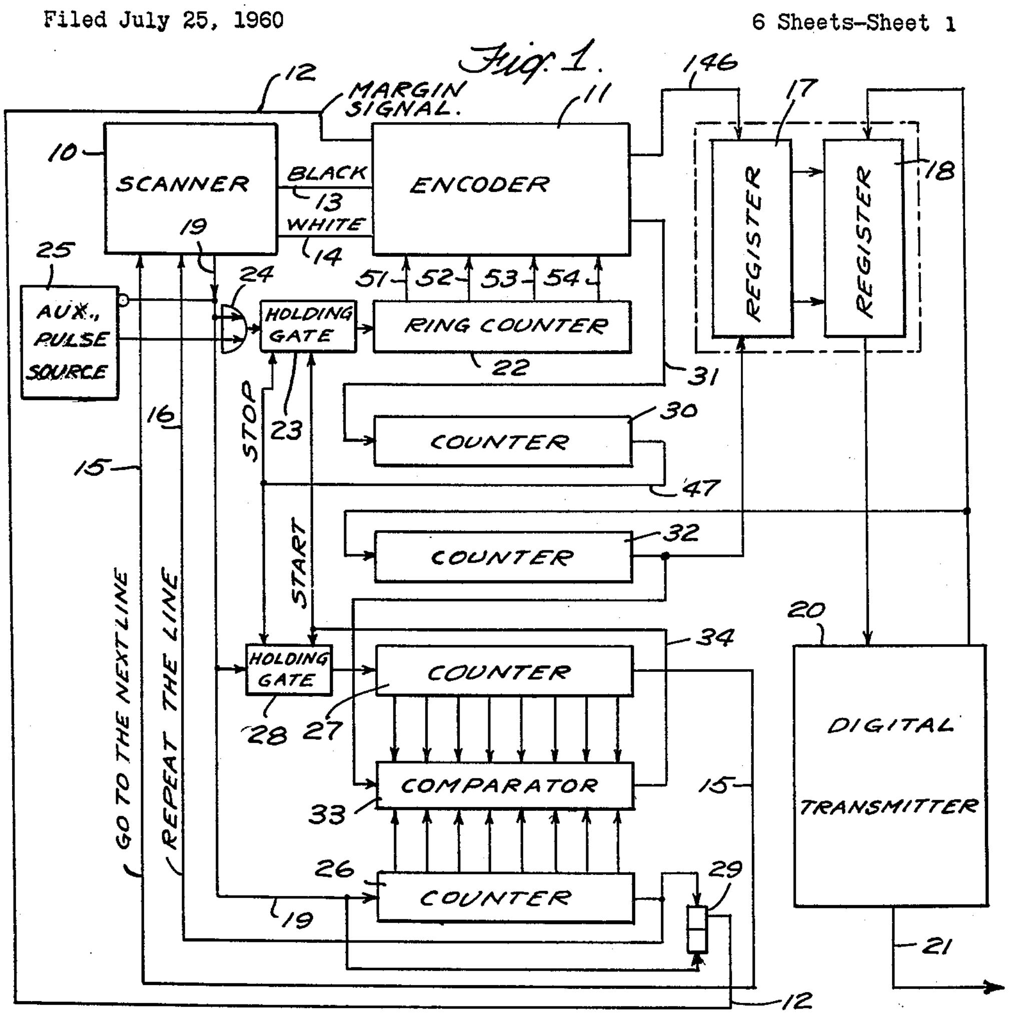
FIG. 1 is a schematic diagram of the entire transmission system which may be used to generate pulses encoded in a run-length code.

Referring now to FIG. 1, the entire transmission system is shown in block form. A scanner 10 scans the picture or graph to be transmitted and sends two types of signals to an encoder 11. The signals represent a black signal on conductor 13 and a white signal on conductor 14. The scanner 10 is controlled by signals from two other circuits to repeat the scanning of the line just scanned or to go to the next line. These signals are applied over conductors 15 and 16. The encoder 11 also receives a margin signal over conductor 12 from multivibrator circuit 29.

The encoder 11 sends its coded run-length signal bits to a first register 17 where the signals are applied in series fashion, a second register 18 receives the stored signals in parallel fashion and then sends them, in series, to a digital transmitter 20 for transmission to a receiving circuit. The digital transmitter 20 may be any type of digital transmission device such as a radio transmitter or a wire line transmitter and the signals sent over the output conductor 21 of this circuit may be modulated in any of the well-known modulation systems. However, the bit transmission rate of the transmitter must be no more than one-sixtieth of the area element scanning rate.

The encoder 11 is controlled in its timing by a ring counter 22 which sends pulses in sequence over four conductors 51, 52, 53 and 54 to the encoder. The scanner 10 generates pulses synchronous with the scanning of area elements, at a pulse repetition frequency of 4 times the area element scanning rate. These pulses are generated by means of a grating to be described later. The pulses are applied over conductor 19 to ring counter 22 through a pulse "or" gate 24 and a holding gate 23. The pulses are also applied as an inhibit signal, to an auxiliary pulse source 25. Source 25 applies pulses to gate 23 only during the time that the scanning synchronous pulses are absent (i.e., when the scanning spot is in the margin) so that the margin code word of nineteen "ones" can be generated by the encoder 11 and sent to register 17. Conductor 19 also leads its pulses to counter 27 through holding gate 28, to counter 26, and to the set input of multivibrator circuit 29.

In order to measure the extent of the scanned portion of a line, counter 26 is provided which is always connected to the scanner 10 and has a counting capacity equal to four times the number of small resolution elements in each scanning line. The counter 26 then starts to count when the scanner starts on each line, and the counter is full and is reset to zero as each line is finished. A second counter 27 has the same capacity as counter 26 but is controlled by a holding gate 28 to count only when the encoder circuit 11 is coding signals from the scanner. This coding is interrupted and gate 28 is disabled when register 17 is filled.

A third pulse counter 30 is provided for indicating the condition of register 17. At the same time as the encoder sends code pulses to register 17, counting pulses are sent to counter 30 over conductor 31. A fourth counter 32 is connected to the synchronizing pulses sent out by the transmitter 20 to register 18. These pulses determine the speed at which the transmitter can accept information and they are applied to register 18 to cause it to shift its bits of information to the transmitter as they are used. The counter 32 is operated by these pulses and tells when register 18 has emptied.

In order to tell when the first and second counters 26 and 27 have the same count, a comparator 33 is connected between each of the circuits. When the comparator is activated by an output pulse of counter 32, it is prepared to detect the next coincidence between counters 26 and 27. When this occurs, the comparator transmits a "start" pulse over conductor 34 to gates 28 and comparator 33, causing a resumption of encoding. All of the above counting and gate circuits are necessary because the scanner 10 operates much faster than the speed of the transmitter. The manner in which these circuits are brought into synchronism will be evident when the operation is described.

The margin signal to the encoder 11 is generated as follows. When a line is being scanned, scanning synchronous pulses on conductor 19 set multivibrator circuit 29. When the line has been completely scanned, counter 26 produces a pulse output which resets circuit 29, producing a D.C. output on conductor 12. As long as the scanning spot is off the scanning raster, this D.C. output remains, since no pulses are present on conductor 19 to set the multivibrator.

Figure 2:
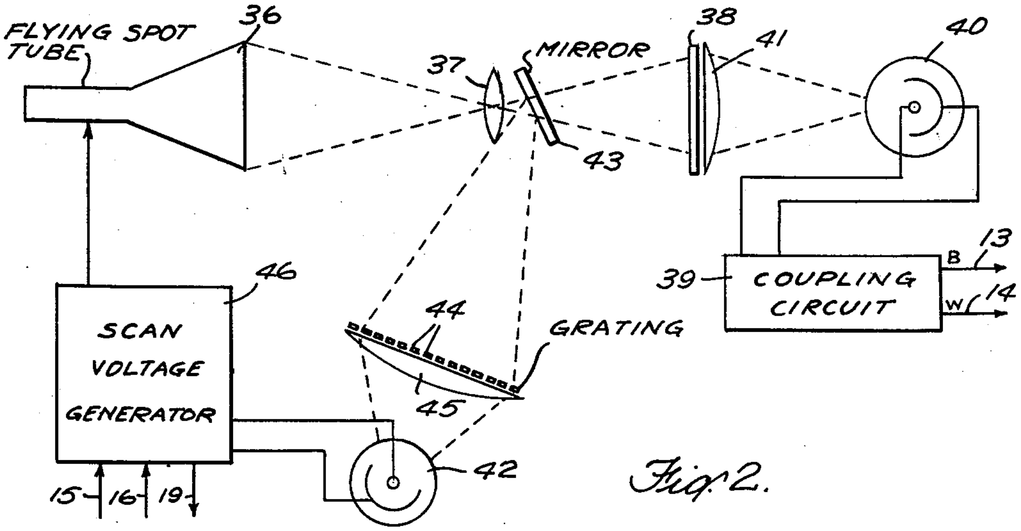
FIG. 2 is a schematic diagram of a scanning system which may be used to generate black and white pulses from a transparency picture.

Many types of scanning devices can be used to determine the white and black areas and to divide these areas into "resolution elements." The cathode ray flying spot scanner shown in FIG. 2 is a preferred type because of its speed, the low inertia of the flying spot control means, and its lack of mechanical moving parts. This device includes a cathode ray tube 36, a lens 37, a transparency 38 which contains the area information to be encoded, and a light-sensitive transducer 40 which receives light transmitted by the transparency 38 and gathered by condensing lens 41. The electrodes in transducer 40 are connected to a source of operating potential and a coupling circuit 39 and furnish the black and white signals sent over conductors 13 and 14. It is necessary to divide the scanning output into resolution elements and an additional light-sensitive transducer 42 is used for this purpose. Light for this device is received from a half-silvered mirror 43 placed in the path of the flying spot beam before it strikes the transparency 38. The light is directed to a grating 44 and a second condensing lens 45 which gathers the transmitted light flashes for the transducer 42. The system is controlled by a scan voltage generator 46 which controls the scanning rate of the spot and its line.

The operation of this system will not be described in general, omitting for the present the details of the encoding circuit and the two registers 17 and 18. At the start of the scanning operation, gates 23 and 28 are disabled, all the counters are at zero, and the two registers 17 and 18 are empty. When the scanner is started by turning on the scan voltage generator 46, gates 23 and 28 are enabled. The scanning generator will initiate the scanning process so that scanning synchronizing pulses on line 19 are not yet present. The auxiliary pulse source is therefore enabled, and its pulses can now enter ring counter 22. The ring counter distributes the received pulses to the four conductors 51, 52, 53 and 54 in sequence, and the encoder 11 generates the margin signal which is applied to register 17 and later delivered to the transmitter 20.

At the end of the margin signal the transmission of the area information starts. Pulses over conductor 19 are applied to ring counter 22 for distribution in the above described manner, through gate 28 to counter 27, and also to counter 26 and circuit 29 as previously described.

The first signal after the margin is white, the next is black. These signals are encoded by circuit 11 and its operation will be described in detail later. During the encoding operation registers 17 and 18 are filled and since register 18 sends its information to the transmitter 20 at a comparatively slow rate, the scanner signals will be blocked for most of the time and the scanning beam will retrace its line several times before the encoder 11 and registers 17 and 18 are ready to receive new signals. It may happen that the register 17 is filled when the scanning spot is part way through a line and gates 23 and 28 are disabled at this point. Counter 26 continues to count while counter 27 is stopped. When counter 32 produces an output, it causes register 17 to transfer its contents to empty register 18, and alerts the comparator 33 to sense the next coincidence between counters 26 and 27 and thereupon transmit a start pulse over conductor 34, enabling gates 23 and 28. Coding can now resume at the point at which it had been interrupted.

All the components shown in FIG. 1 (except the encoder 11) are well-known and have been described in prior publications. The details of the counters, gates, and registers need not be described here.

The above described system assumes that the grating 44 (FIG. 2) produces light pulses applied to the transducer 42 which are generated at four times the frequency of the scanned resolution elements. If the scanning spot system and the associated circuits have the ability to transmit very small resolution elements the grating necessary for four times the frequency may be quite fine and hard to keep in adjustment. The described system may be replaced by a coarser grating having a frequency equal to the scanned resolution elements. In this case, counters 26 and 27 will then count area elements, that is, they will operate at one-quarter the speed and each have two less counting circuits. The ring counter 22 may be replaced by a delay line tapped at intervals corresponding to one-fourth of the spacing between successive scanning sync pulses. The encoder 11 is thus supplied with four timing pulses per area element, as in the scheme employing the ring counter. In addition, the auxiliary pulse source 25 must be altered to produce a frequency of pulses one-quarter of the rate as described.

The system, as described herein, contemplates only the transmission of black and white shades. More shades can be accommodated, if desired, by adding additional circuits to the scanner, increasing the number of multivibrator circuits 91, 93 and 94 in FIG. 3, and adding corresponding circuits in FIG. 6. Also, the code word will then have extra digits, or bits, added to the address, the number of extra bits being dependent on the number of shades the system can transmit.

The invention, as described herein, includes only the encoder which transforms areas of black and white into a run-length code for transmission to a utilization circuit. The circuit which transforms the run-length code into a black and white picture includes a printer, synchronizing circuits, and a decoding circuit which are quite similar to the corresponding circuits described here.

*Run Length Code*

The code used in this application denotes areas of black and white and, instead of transmitting coded indicia for each small elemental area, the shade is first coded (in this case, either black or white) and then the length of the scanned area having the same shade is coded and transmitted. The run-length code results in savings of transmitting time from 2 to 20 depending upon the nature of the area of intelligence to be scanned. With a white margin to start before each run is begun, the shade code may be omitted. The encoder then produces only margin signals and run length. At the receiver, the first run following a margin signal is printed as white, then each successive run is printed in alternate black and white.

FIG. 8 lists a number of coded runs, from 1 to 10 in sequence, and other sample codes up to a run length of 1152. The code has two parts. The first is an address, and the remainder a straight binary number. The purpose of the address portion is to specify a run-length interval and to specify the length of the code word. The remainder of the code word specifies the exact length of the run. The number of bits required for the address portion of the code word is determined by the number of run-length intervals chosen and the number of bits in the remainder is determined by the size of the interval.

Consider, for example, a run-length of ten. It is in the interval 9–16, and therefore has an address 110 (FIG. 8). The interval 9–16 contains 8 possible run-lengths. The remainder must, therefore, contain 3 bits to specify the correct run-length. Ten is the second of the 8 possible lengths, so the remainder is 001. The entire code word for a run of 10 is therefore 110001.

To demonstrate how the code is formed, the coding operation in a facsimile system will now be described in general terms (see FIG. 9). The input to the coder is the shade of successive areas along a scanning line of the intelligence area to be encoded. The coder circuit compares the shade of an element with the shade of the previous element. If the shades are the same, a binary counter 141 which is recording the length of the run is advanced by one count (also shown in detail in FIG. 6). If the shades are different (a change of black to white or white to black) the contents of the counter are transferred in coded form to a shift register 144 whose serial output on conductor 146 is fed by buffer circuits to a transmitter modulator 20 (see FIG. 1). Let it be assumed that a very long run has just ended and a 19 bit code word has just been transferred into this output shift register 144. When the next area element is scanned, the information in the register is shifted three times so that the first three register components 1, 2 and 3, are empty (FIG. 9). If the area being scanned is shorter than 5 elements, a run-end pulse will be applied over conductor 116 before component *c* of the counter has turned to a condition indicating a 1. In that case, components *a* and *b* will have their information transferred to components 1 and 2 of the shift register. This process is then repeated. If the run is longer than four elements, when circuit component *c* is activated to record a 1, the register shifts once and a 1 is entered in component 4. Now, as long as the run does not exceed a length of 8, the run-end pulse transfers the contents of components *a* and *b* to components 1 and 2.

If component *d* of the counter 30 is activated to represent a 1 before a run-end pulse appears, the register shifts two more times, producing the result of a zero in components 1, 2, 3, 4, 5, and a "one" in component 6. Then a "one" is entered into component 5.

As each successive component in the counter 141 is activated to record a 1, the shift register 144 is shifted twice and a 1 is entered into the component succeeding the component which previously had recorded the 1. From the above description it is evident that the shift register is always ready to accept a run from the run-length counter. This code generating method and apparatus requires a shifting rate in the register of four times the area element scanning rate.

*Encoder Circuit*

The encoder circuit is shown in FIGS. 3, 4, 5 and 6, with explanatory symbols shown in FIG. 7. The symbols representing multivibrators, switching gates, and inhibitor gates have been adopted in order to simplify the circuit means and make the operation more understandable. The bistable multivibrator 60 shown in FIG. 7(*a*) can be the usual well-known type containing two vacuum tubes or two transistors. The multivibrator conducts in one of its halves and is nonconductive in the other half. A shift of conductance may be obtained by applying an actuating pulse to a common circuit conductor 61 coupled to both control circuits of the amplifying components. This pulse always transfers the conductance, no matter which side was conducting. Each time a shift of conductance is made, a pulse is sent over the conductor leading from the side which has just been made conducting. This pulse is due to the steep wave front of a D.C. voltage which remains on this conductor as long as that side is conducting. This D.C. voltage may be employed to enable gates. Conductance can also be shifted by pulses supplied over conductors 62 or 63 coupled to separate halves of the multivibrator circuit. An operating pulse applied to conductor 62, for example, shifts conductance to the right half only if the left half is conducting. If the left half is nonconducting, the applied pulse does nothing. The same conditions govern conductor 63 which is coupled to the left half of the circuit. The same conditions regarding pulses and D.C. enabling voltages apply when conductance is shifted by either conductors 62 or 63. In order to maintain uniformity in the following description, it is assumed that an operating pulse applied to conductor 62 results in an operating D.C. potential (and pulse) on the right output conductor 64, and an operating pulse supplied to conductor 63 results in an operating pulse and D.C. potential on the left output conductor 65.

The pulse "and" gate, shown in FIG. 7(*b*), permits conduction from conductor 66 to conductor 67 only if an operating D.C. potential is applied to conductor 68. Vacuum tubes, diodes, and three electrode transistors may be used in this gate circuit and either positive or negative pulses may be employed, depending upon the nature of the circuit.

The pulse "or" gate shown, in FIG. 7(c), is a symbol representing a circuit which passes a pulse from either conductor 70 or 71 to output conductor 72.

The pulse inhibit gate, shown in FIG. 7(*d*) is a symbol representing a circuit which passes a pulse from conductor 73 to conductor 74 if there is no operating D.C. potential on conductor 75. An operating D.C. potential applied to conductor 75 disables the gate, eliminating conduction through the circuit.

The D.C. "and" and "or" gates, shown in FIGS. 7(*e*) and (*f*) are the same as those shown in (*b*) and (*c*) except that they are arranged to be operated by sustained direct current potentials and currents.

The above described circuits and symbols are old in the art and descriptions of them may be found in "High Speed Computing Devices," a book published by McGraw-Hill (New York) in 1950 by the Engineering Research Associates, pages 32 to 55. Also, in "Fundamentals of Digital Computers," a book published by Prentice-Hall, Inc. (Englewood Cliffs, N.J.) in 1958, by Mathew Mandel, pages 106 to 123.

The encoder circuit is controlled by a ring counter 22 which provides four sharp voltage pulses in sequential repetition over conductors 51, 52, 53 and 54. It also receives a margin signal over conductor 12 which acts as a D.C. control potential for gates 76 and 77 the outputs of which are connected to multivibrator 78. The black signal is received over conductor 13 and partially enables an "and" gate 86. The white signal is received over conductor 14 and partially enables an "and" gate 84. Other gates and multivibrators will be identified during the following description of the operation.

The margin signal identifies the end of a complete scanned line. This signal results in a series of 19 pulses or "ones" which are generated in the output shift register 144 to be later transmitted by the digital transmitter 20. When the margin signal is applied, gate 76 is disabled and gate 77 is enabled. At the next time-3 (when a pulse from ring counter 22 is sent over conductor 53) a pulse goes through gate 77, shifts circuit 78 to the right, disabling gates 84, 86, 98 and 102, and enabling gate 80. The output pulse of circuit 78 shifts circuit 81 to the right and gate 82 is enabled. At time-4 there is no action in this part of the circuit but at the next time-1, a pulse from conductor 51 passes through gate 82 and moves over conductor 83 to the next circuit. The pulse from conductor 51 is also applied to gates 92, 103, 98 and 102. At time-2, a pulse is applied over conductor 52 to gates 84, 80, 86, 87 and 88. Gate 80 is enabled and a pulse passes through "or" gate 90 to shift circuit 91 to the left and enable gates 92 and 100. Also, at time-2 circuit 81 is reset so that gate 82 is disabled. At time-3, a pulse is applied over conductor 53 through gate 77 to circuit 78 but since circuit 78 is already shifted to the right side, nothing happens. At time-4, nothing happens in this circuit since gate 76 is disabled by the margin signal. At time-1 again, with gate 92 enabled, the pulse passes through the gate and shifts circuit 93 to enable gate 87. Now, at time-2, the pulse over conductor 52 passes through gate 87 and shifts circuit 94 to the left if it was not already in that condition.

Gates 95 and 100 whose outputs are directed through "or" gate 97 to control inputs of gates 98 and 102, are now disabled by the conditions of circuit 94 and circuit 91. Gate 100 passes a signal to gate 97 if circuit 91 is shifted to the left and circuit 94 is shifted to the right. Gate 95, conversely, passes a signal to gate 97 if circuit 91 is shifted to the right and circuit 94 is shifted to the left. With the circuit in this condition nothing happens until the margin signal on conductor 12 is removed. While the margin signal is on, a pulse is sent over conductor 83 during the first time-1 only, after which gate 82 is disabled but no signals can be transmitted over conductors 96 and 101 because gates 98 and 102 are disabled. Gates 98 and 102 cannot conduct as long as circuit 78 is shifted to the right.

When the margin signal is removed, the next signal is white and a D.C. control signal is transmitted over conductor 14 to gate 84. With the margin signal off, gate 76 is enabled and gate 77 is disabled. At time-4, the timing pulse is sent through gate 76 to shift circuit 78 to the left and thereby send control inputs to gates 84, 86, 98 and 102. Circuit 78 remains on the left as long as there is no margin signal. Gate 80 is also disabled. Since multivibrators 91 and 94 are both shifted to the left, gates 95 and 100 are both disabled as are gates 97 and 98. Gate 102 is enabled.

Now at time-1, a timing pulse is sent over conductor 51 through gate 102 to "Count Pulse" conductor 101 to the next circuit, and is also applied to gates 92 and 103

(of which gate 92 is enabled). At time-2, the timing pulse is applied over conductor 52 to gates 84, 86, 80, 87 and 88. The pulse through gate 84 passes through gate 90 to circuit 91 but no action results because this circuit had been shifted to the left. At times-3 and 4 nothing happens. If the white signal is maintained on conductor 14 the same pulse is produced at time-1 as described above and line 101 transmits its count pulse to the next circuit. This action continues as long as white is scanned.

If now the shade sensed is black, a signal is transmitted from the scanner 10 over conductor 13 to gate 86, enabling it and passing a timing pulse at time-2 to circuit 91, shifting it to the right and enabling gates 95, 97, 98 and 103, and disabling gate 102. There is no action at times-3 and 4 but at time-1, a timing pulse over conductor 51 to output gate 98 appears as a "Run-End Pulse" on conductor 96 to indicate to the next circuit that the white area is finished and a black area has been sensed. At this same time circuit 93 is shifted to the right by a pulse through gate 103. This causes gate 87 to be disabled and gate 88 to be enabled. At time-2, circuit 94 is shifted from the left to the right side by the timing pulse over conductor 52 through gate 88 and, assuming that the "Black" signal on conductor 13 had remained, circuits 91 and 94 are both on the right side, thereby disabling gates 95, 100 and 97, but enabling inhibit gate 102 since its inhibit potential is removed. At the next time-1 pulse, and all succeeding 1 pulses, an output pulse is sent over conductor 101 to the next circuit to record a count. This condition lasts as long as the area sensed is black. If the left side of circuits 91 and 94 are designated White and their right sides Black, then circuit 91 is always in the condition of the shade as currently sensed, while circuit 94 is always in the condition of the shade previously sensed. Circuit 93 is a buffer stage permitting the proper transfer of information from circuit 91 to circuit 94.

The white and black areas are now sensed in sequence in accordance with the transparency areas and each time a change is made, a signal is sent over conductor 96 to record a Run End Pulse. During the sensing of either black or white, count pulses are sent over conductor 101 at each time-1. When a margin is again sensed the same sequence of events occurs as described above.

Figure 4:
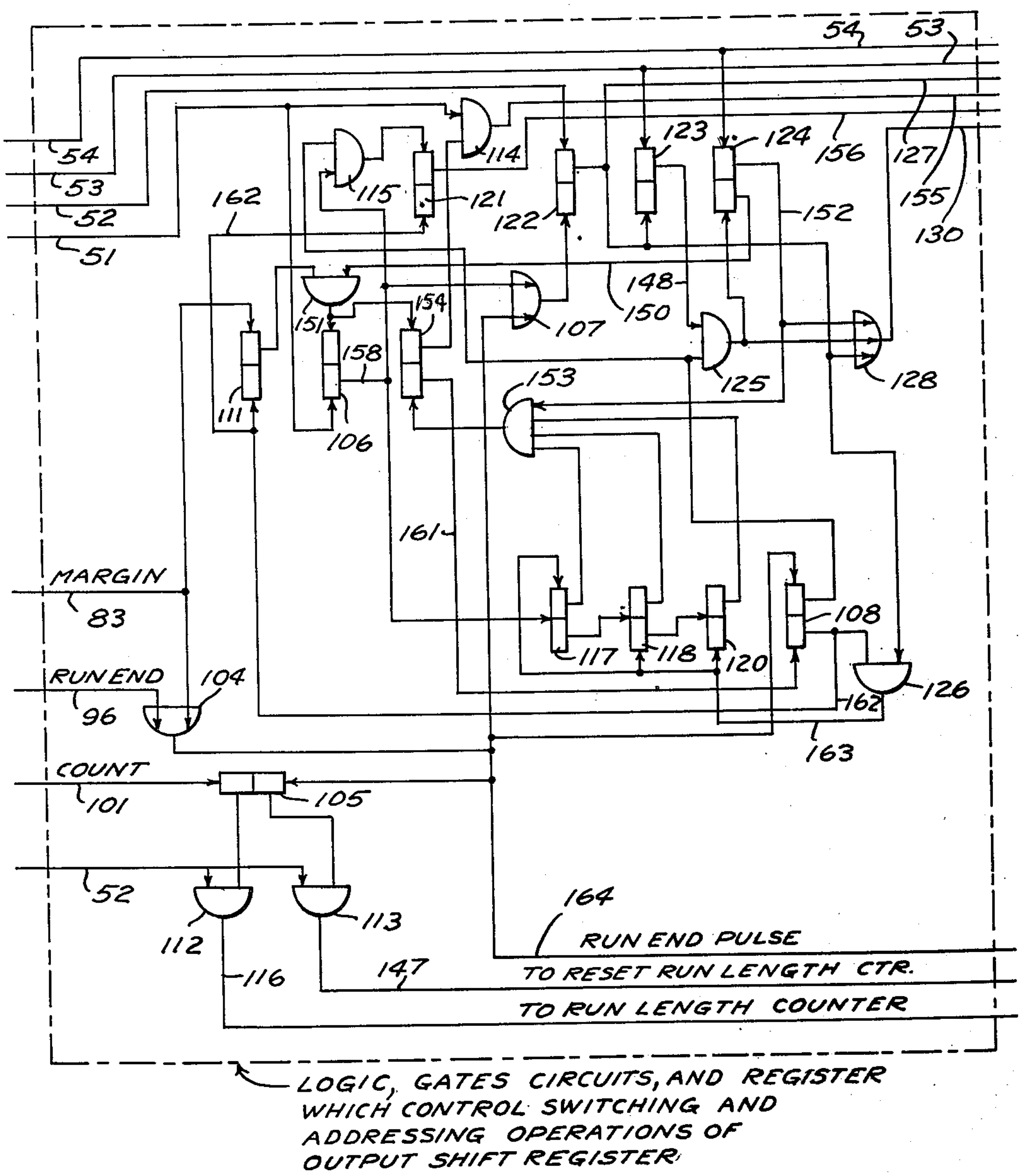
FIG. 4 is a schematic diagram of connections of one-half of the gating circuits which control the operations of the output shift register.
Figure 5:
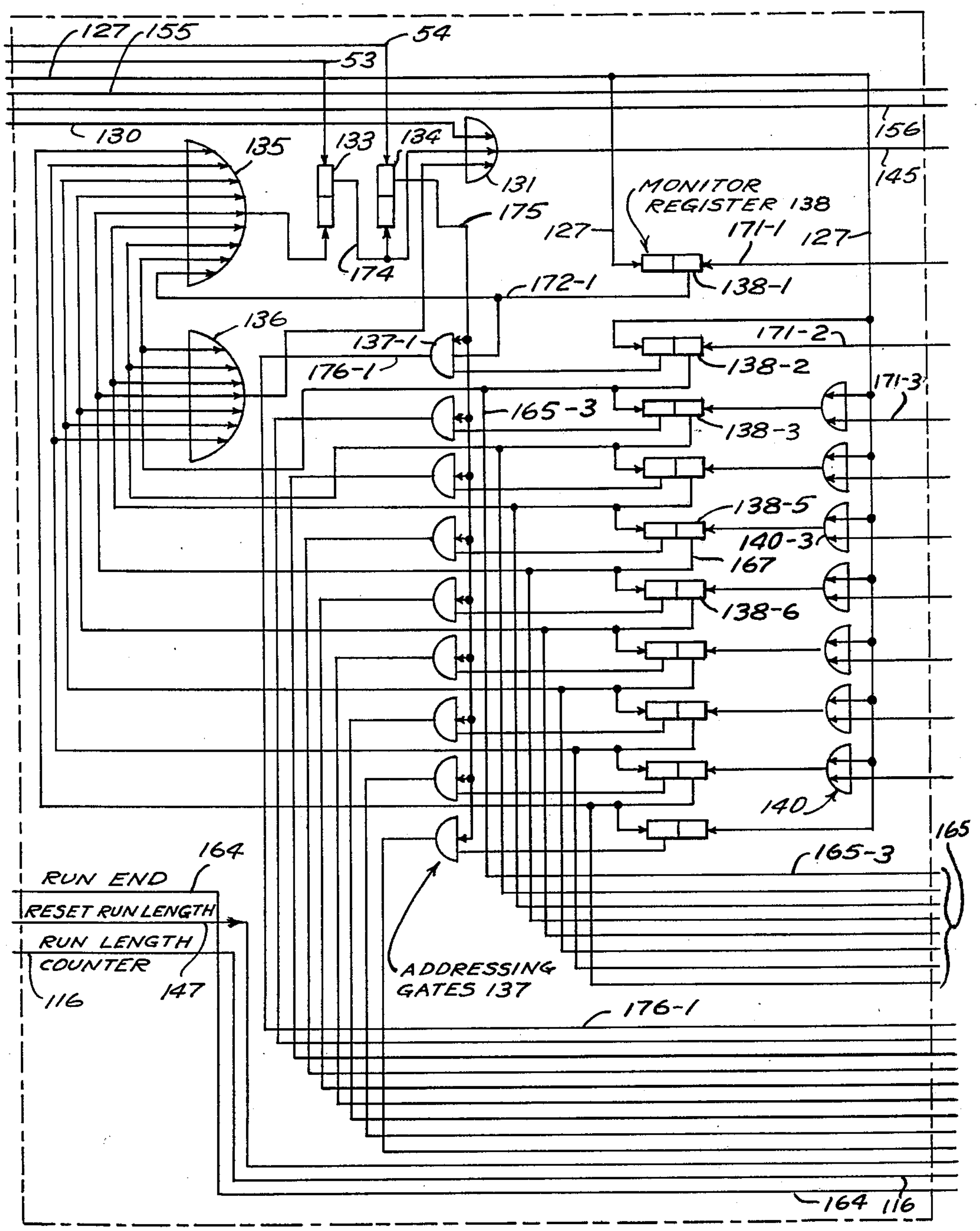
FIG. 5 is a schematic diagram of connections of the second half of the gating circuits shown in FIG. 4.

Referring now to FIGS. 4 and 5, the timing pulses 51, 52, 53 and 54, are again used to control the encoding components and the Margin, Run End and Count pulses are available on conductors 83, 96 and 101. The circuits shown in FIG. 4 are the actual encoding circuits which combine the three signals, Margin, Run End and Count, and the timing pulses on conductors 51, 52 and 54. The circuits in FIG. 4 include a shifting register (consisting of circuits 122, 123 and 124) which causes shift pulses to be applied to the output shift register 144 during a run end and during generation of the margin code word. They also include a counter (consisting of circuits 117, 118 and 120) which controls the iterative use of the shifting register for the generation of the margin code word. The remainder of the multivibrator circuits and gates in FIG. 4 have control functions which will be described in detail during the description of the circuit operation.

Figure 6:
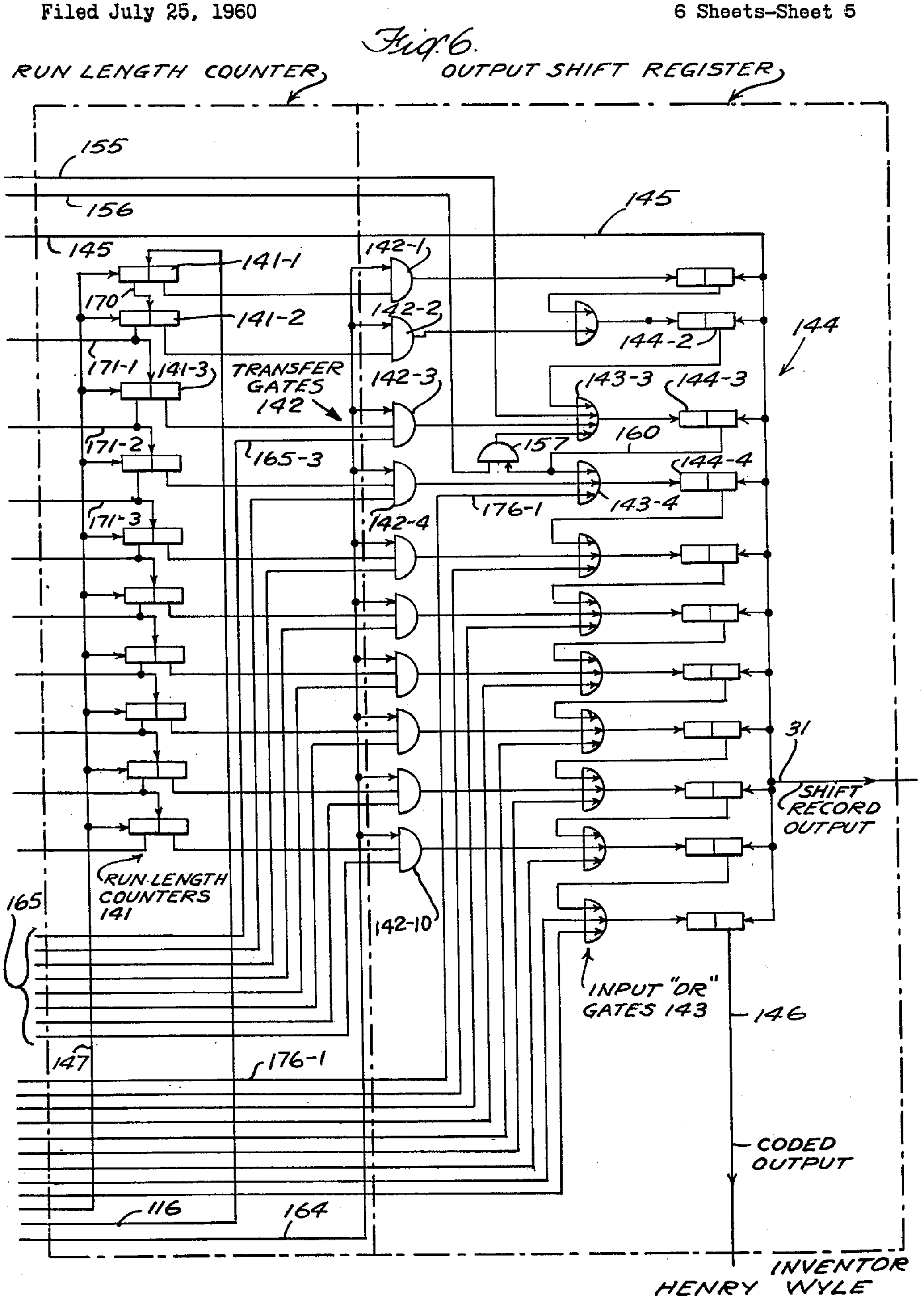
FIG. 6 is a schematic diagram of connections of the run length counter plus the output shift register.

The circuit shown in FIG. 5 includes two multiple "or" gates 135 and 136 and another shifting register 133—134. This circuit also shows nine addressing gates 137 and ten multivibrator circuits 138 hereinafter called a monitor register. This circuit also includes seven "or" gates 140 which aid in resetting the actuated circuits in the monitor register bank. The circuit shown in FIG. 6 shows ten multivibrator circuits 141 which act as a run-length counter. The outputs of the circuits in the run-length counter are applied to a series of ten run-length transfer gates 142 which transfer pulses to another series of ten "or" gates 143 which are employed to transmit activating pulses to (and within) the output shift register 144. The output shift register 144 includes 10 multivibrator circuits and receives a plurality of shift pulses over conductor 145 to shift information down to the encoder output line. The information in the output register is transferred over conductor 146 to register 17 and finally to circuit 20 (shown in FIG. 1). Conductor 146 transmits the encoded pulses shown in FIG. 9.

The margin pulse is applied over conductor 83 and passes through an "or" gate 104 to multivibrator circuits 105, 122 (through gate 107) and 108. The margin pulse is also applied to circuit 111. The purpose of this pulse is to set up the circuits for the counting pulses which arrive later. In some cases the circuits enumerated are not shifted at this time since they may be in the proper starting condition.

The Run End Pulse is applied at time-1 over conductor 96, and passes through an "or" gate 104 to circuits 105, 108 and (through "or" gate 107) to circuit 122. It also is applied to gates 142 (FIG. 6) causing selective transfer of the contents of the run-length counter 141 to the output shift register 144. As a result of this pulse, circuit 105 causes the enabling of gate 113 and the disabling of gate 112; also, the actuation of circuit 108 enables gates 115 and 125 and disables gate 126. Circuit 122 is now in its lower state, so that a pulse applied at time-2 actuates the circuit and produces an output pulse on conductor 127. This output pulse is applied to the lower input of circuit 123, setting that circuit into its lower state. The pulse output on conductor 127 is applied to the (disabled) gate 126 and also passes through gate 128, over conductor 130 through "or" gate 131 (FIG. 5), over conductor 145 to shift the output shift register 144.

The pulse on conductor 127 is also applied to the monitor register 138 to reset all its components. Also, at time-2, a pulse is applied over conductor 52 through enabled gate 113, over conductor 147, to reset the run-length counter 141 (FIG. 6).

At time-3, a pulse is applied over conductor 53 to the upper input of circuit 123, actuating that circuit to produce an output pulse on conductor 148. This pulse passes through enabled gate 125 and is applied to circuit 124 and also passes through gate 128 to conductors 130 and 145. This pulse shifts the output shift register 144 as before. Circuit 124, which was in its upper state, is actuated by the input pulse to produce an output pulse on conductor 150. This pulse is applied to gate 151 which is disabled and no further action occurs.

At time-4 an input pulse is applied over conductor 54 to the upper part of circuit 124 actuating it to produce an output pulse on conductor 152. This output pulse is applied to disabled gate 153 and passes through gate 128 to conductor 130. This pulse again shifts the output shift register 144 as before.

At the end of the first four timing pulses, the contents of the run-length counter have been selectively transferred to the output shift register 144 and the information in register 144 has been shifted three times to transfer three bits of information over conductor 146 thereby making room for the next code word. From the above description it will be obvious that the output shift register is always in a condition to accept information as fast as the scanner 10 can produce it. This fact is one of the major features of the encoder circuit.

Also, at the end of time-4, the monitor register 138 has been reset, the run-length counter has been reset and the shifting register circuits (122, 123, and 124) have all been reset to the upper state.

The Run End Pulse comprises a single pulse at time-1 after a change of shade has been detected. The above described operations occur after this Run End Pulse is received by the circuits shown in FIGS. 4, 5 and 6. At the next time-1 a Count Pulse or another Run End Pulse will be received, depending upon a detected change of shade. The change of shade detection is made at time-2, during the time the output shift register 144 is operated as a result of the previous Run End Pulse. If a second Run End Pulse is received by gate 104 the above described operation is repeated.

If a Count Pulse is received over conductor 101, circuit 105 is actuated, gate 112 is enabled, and gate 113 is disabled (at time-1). Also, at time-1, a pulse is applied over conductor 51 to disabled gate 114 and to the lower input of circuit 106. However, since this circuit was already in its lower state, no output is produced.

At time-2, a pulse is applied over conductor 52 to gates 112 and 113, causing a pulse to be transmitted over conductor 116, to the input of the run-length counter 141. An input pulse is also applied over conductor 52 to the upper part of circuit 122, but no output is produced because no change is made. Similarly at times-3 and 4, input pulses are applied over conductors 53 and 54 to the upper inputs of circuits 123 and 124. Again there is no output pulse because there is no triggering action.

Figure 3:
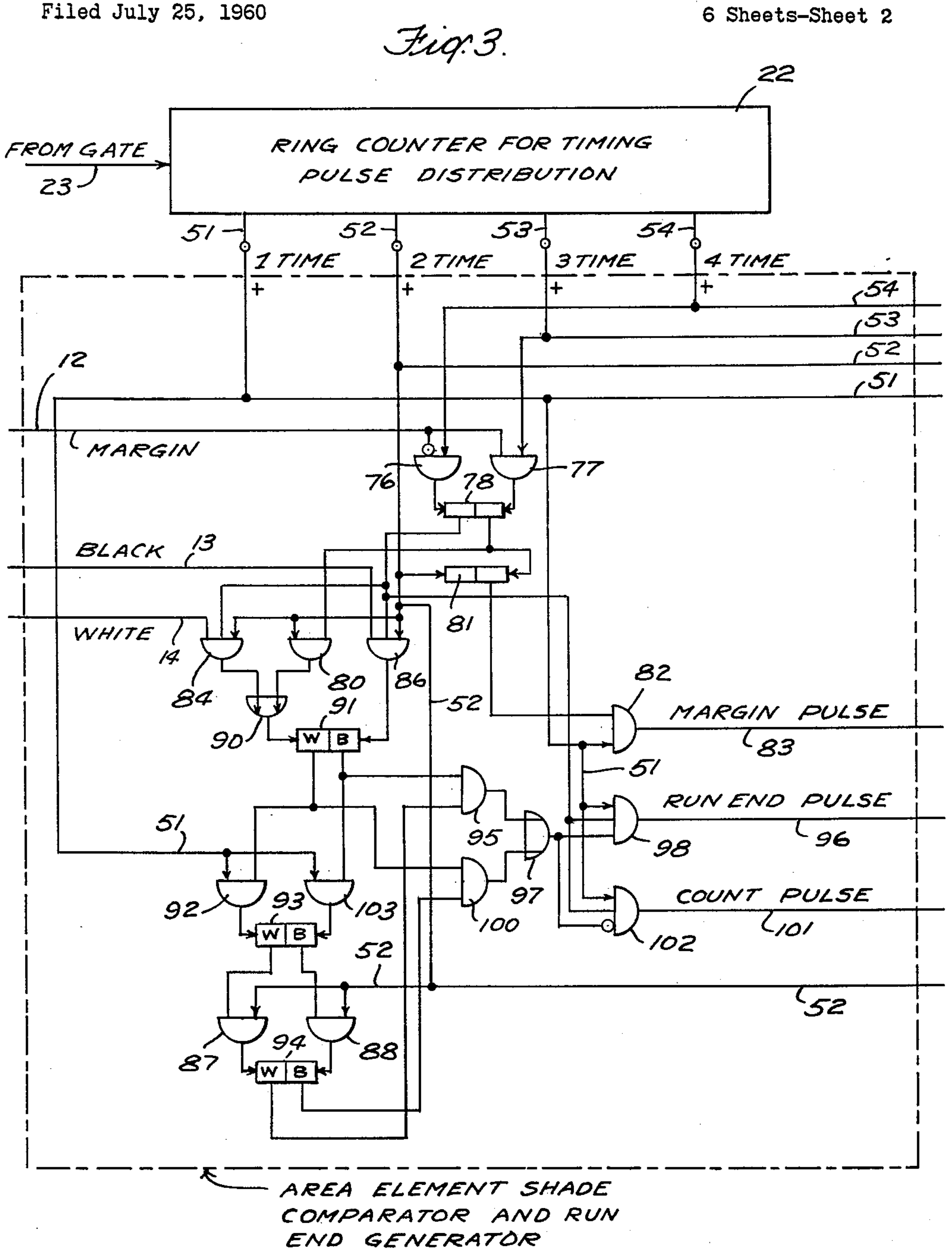
FIG. 3 is a schematic diagram of connections showing the timing pulse generator in block and the run end generator in a detailed arrangement of symbolic multivibrator and gate circuits.

During time-2 of the four-time cycle, the shade of the next area element had been detected (see FIG. 3). If this detection had shown no shade change, then the same procedure which has just been described is repeated, with a consequent advance of the Run-Length Counter 141 by one. This operation is continued until a shade change is detected (at time-2). The previously described Run End procedure would then go into operation at the subsequent time-1.

One phase of the operation of FIGURE 4 remains to be described. This is the Margin Procedure. At the time-1 following the detection of the Margin, a Margin Pulse is applied over conductor 83 to multivibrator circuit 111 and "or" gate 104. As could be seen from an examination of the Run End and Count modes of operation of FIGURE 4, the state of the multivibrator circuits in FIGURE 4 prior to the arrival of the Margin Pulse is as follows: Circuits 121, 111, 106, 154, 118 and 120 are in their lower states, and circuits 122, 123, 124, 117 and 108 are in their upper states. Assuming that the previous operation of the circuit had been in the "Count" mode, circuit 105 is in its left state.

The time-1 margin pulse transfers circuit 111 to its upper state, enabling gate 151, and passes through gate 104 to circuits 105, 108, and (through "or" gate 107) to circuit 122. It also is applied over conductor 164 to gates 142 (FIG. 6) causing selective transfer of the contents of the run length counter 141 to the output shift register 144. It can be seen that the effect of the margin pulse is exactly the same as that of a Run End Pulse, except for its additional actuation of circuit 111. The sequence of events at times-2, 3, and 4 is therefore the same as for the Run End Procedure, with the following exception: At time-3, when circuit 124 is transferred into its lower state, an output pulse passes over conductor 150, through the now enabled gate 151, and transfers circuits 106 and 154 to their upper states. The D.C. potential now present on the upper output of circuit 154 enables "and" gate 114.

At the end of the first four timing pulses, the information in the output shift register 144 has been shifted three times so that the last three stages of the register are empty. The encoder will now generate the nineteen "ones" which make up the margin code word and transfer this word to the output shift register 144. It will accomplish this by the iterative use of a shifting procedure similar to the one just completed. It should be noted at this point that gates 114 and 151 are in the enabled state, and will remain so until close to the end of the margin procedure.

At the next time-1, a timing pulse is applied over conductor 51 to gate 114 and to circuit 106. Since gate 114 is enabled, the pulse passes through it, over conductor 155, through "or" gate 143-3 (FIGURE 6) and actuates circuit 144-3 of the output shift register 144. Thus the first of nineteen "ones" has been placed in the output shift register 144. Since circuit 106 was previously in its upper state, the timing pulse applied over conductor 51 actuates it and produces an output pulse on conductor 158. This pulse passes through the enabled gate 115 to transfer circuit 121 into its upper state, through "or" gate 107 to transfer circuit 122 into its lower state, and to the complementing input of circuit 117, advancing the counter consisting of circuits 117, 118 and 120 by one count. The D.C. output of circuit 121 is applied over conductor 156 to enable gate 157 in FIGURE 6. The function of gate 157 is to modify the normal shifting action of the output shift register 144 as follows. In normal operation, the application of a shift pulse over conductor 145 to the individual circuits comprising the register, causes the state of every circuit to be transferred to the next higher-numbered circuit beneath it. Thus, if circuit 144–2 were in its right state (corresponding to the binary digit "0") and 144–3 in its left state (corresponding to the binary digit "1"), then the application of the shifting pulse to the right inputs of both circuits would produce no output from circuit 144–2, but would actuate circuit 144–3 to its right side "0," producing an output which would be applied over conductor 160 and through pulse "or" gate 143–4 to the left side of circuit 144–4. Circuit 144–4 would then be in its "1" state. As a result of the enabling of gate 157, the output pulse on conductor 160 is re-introduced to circuit 144–3 through gate 143–3, as well as passed on to the next circuit in the normal manner. Thus, if circuit 144–3 contains a "1," which is presently the case, each shift pulse will cause it to return to this state in addition to transferring the "1" to the next circuit 144–4.

Thus, to complete the generation of the nineteen "ones," the register 144 should be shifted 18 times with gate 157 enabled, and one more time with gate 157 disabled. The 18 shifts are accomplished in six four timing-pulse cycles (the time–1 of the first of these six has just occurred). At times–2, 3 and 4 of this first cycle, the shifting register (circuits 122, 123, 124 in FIG. 4) applies 3 shift pulses to the output shift register 144 as before. Note that at time–3, the pulse output of circuit 124 is again applied over conductor 150, through gate 151, to again transfer circuit 106 into its upper state.

The second, third, fourth, fifth and sixth cycles are identical to the first, with the following exception. At time–1 of each cycle, the counter consisting of circuits 117, 118, 120 is advanced by one count. Thus, at time–1 of the sixth cycle, the counter is advanced so that its outputs cause gate 153 to be enabled. At time–4 of the sixth cycle, the output pulse of circuit 124 is passed through this gate and transfers circuit 154 into its lower state. This disables gate 114 and produces an output pulse which passes over conductor 161 to circuit 108, transferring that circuit into its lower state. This disables gates 125 and 115, enables gate 126, and applies a pulse over conductor 162 to circuits 111 and 121. This, in turn, causes the disabling of gates 151 and 157 (FIG. 6). At the next time–1, a timing pulse is applied over conductor 51 to disabled gate 114, and to circuit 106, transferring that circuit into its lower state. The output produced on conductor 158 is applied to the disabled gate 115, to circuit 117, and to circuit 122 (through gate 107). At time–2, the timing pulse on conductor 52 actuates circuit 122, causing an output pulse to appear on conductor 127. This pulse resets the monitor register 138 (see FIG. 5) as before, actuates circuit 123 as before, and passes through gate 128 as before to eventually shift the output shift register 144. Note that during this nineteenth shift, gate 157 was disabled. Thus the "one" that had been stored in circuit 144–3 was transferred to circuit 144–4, but was not re-entered into circuit 144–3.

We may now summarize what has occurred in the output shift register 144, so far. Upon application of the margin pulse over conductor 83 to FIGURE 4, the output shift register shifted 3 times, clearing the 3 lowest order bits in the register. Then a "one" was deposited in circuit 144–3. This was followed by nineteen shifts which resulted in nineteen ones being transferred down the shift register, and the last three circuits 144–1, 144–2, 144–3 again being cleared (and therefore ready to accept the next run). It is therefore desirable that any further operations of the circuit shown in FIGURE 4 do not affect the output shift register.

Returning now to the operation of FIGURE 4 at time–2, the output pulse of circuit 122 is also applied over conductor 127 to gate 126. This gate is, for the first time, enabled, and the pulse passes over conductor 163 to reset the counter consisting of circuits 117, 118 and 120. At time–3, a timing pulse on conductor 53 resets circuit 123 to its upper state, producing a pulse output which passes over conductor 148 to gate 125. This gate, which is now disabled, prevents the pulse from passing to gate 128 and circuit 124. Hence, the time–4 pulse on conductor 54 is applied to circuit 124 which is still in its upper state, and no output pulse is produced on conductor 152. The circuit of FIGURE 4 is now ready to accept a count or run end pulse resulting from scanning of the next line.

The margin operation of FIGURE 4 may be summarized as follows: During the first cycle of four timing pulses, the circuit of FIGURE 4 causes the output shift register 144 to shift 3 times. During the next seven cycles, the circuit of FIGURE 4 causes the generation of 19 "ones" in the output shift register, with the register shifting down its contents so that in its final state its last three bit locations (circuits 144–1, 144–2, 144–3) are empty.

The margin operation of the circuit of FIGURE 4 has been registered as taking place after a "count" operation. If it occurs following a "run end" cycle, the description remains valid except that the initial condition of circuit 105 is with the left side "on." This completes the description of the operation of the circuit of FIGURE 4.

The operation of the circuits shown in FIGS. 4, 5, and 6 has been described when a margin signal is received (on conductor 83) and when a run end pulse is received (on conductor 96). The operation of the circuits shown in FIGS. 5 and 6 when a run-length counting signal is received (on conductor 116) will now be described.

Let it be assumed that a run end procedure has just been completed and a run-length is about to start. The components in FIGS. 5 and 6 are now in the following condition: Multivibrator circuits 133 and 134 are in their upper states, circuits 138–1 and 138–2 of the monitor register are in their left states and the remaining circuits 138–3 through 138–10 are in their right states. All the addressing gates 137 are disabled, all the multivibrator circuits of the run-length counter 141 are in their left or zero states, and all the transfer gates 142 are disabled because of the condition of the run-length counter circuits 141. Gate 157 is disabled since there is no voltage on conductor 156 and the three upper multivibrator circuits 144–1, 144–2 and 144–3 of the output shift register are in their right or zero states because the operation of the run end pulse has just shifted the code word three times. The remaining circuits of the output shift register 144 contain the code bits resulting from previous runs.

At every successive time-2 during the continuation of the run which has just started, a count pulse is applied over conductor 116 and actuates the first multivibrator 141–1 of the run-length counter. The first of these pulses transfers circuit 141–1 into its right state (to denote a "one") and also enables gate 142–1. The second pulse transfers circuit 141–1 back to its left or zero state, disables gate 142–1, and sends a carry pulse over conductor 170 which transfers circuit 141–2 into its right state to denote a "one." This enables gate 142–2. From the above it will be obvious that transfer gates 142–1 and 142–2 are enabled whenever the corresponding run-length counter circuit is in its "one" state, and are disabled when in the "zero" state. However, gates 142–3 through 142–10 are also connected respectively to one of the conductors 165 and while they are disabled by their corresponding circuit 141 being in the "zero" state, to be enabled, their circuit 141 must be in the "one" state and a voltage must also be applied to their conductor 165. Conductors 165 are connected to the right side of the circuits 138 in the monitor register and they all have such an enabling voltage at the start of a run except for the conductor connected to circuit 138–2.

As the run continues (continuation of a white or black scanned area) the counting action in the run-length counter continues as described above until a run end pulse appears at time-1 on conductor 164 (denoting the end of the black or white area). The pulse on conductor 164 passes through all of the enabled gates 142 and through the "or" gates 143 to multivibrator circuits 144 in the output shift register, thereby transferring the information bits in counter 141 to register 144. This last action of a pulse on conductor 164 is the final step in the encoding process of a particular run.

In order to understand the selectivity which is employed, reference is made to the chart in FIGURE 8 which shows how the run-length code is generated. A run of one is identified by the code word 000. For such a run, no count pulses appear on conductor 116 prior to the run end pulse on conductor 164. All the transfer gates 142 are disabled and no bits are entered into the output shift register, therefore the last three circuits 141–1, 144–2 and 144–3 remain in their right or "zero" states and this group of three zeros is later shifted down the output shift register as will be indicated later.

A run-length of 2 is identified by the code word 001 and, for such a run, only one pulse is sent over conductor 116 prior to the run end pulse on conductor 164. As dencribed above, this pulse actuates circuit 144–1 of the output shift register. For all run-lengths up to and including 4, a maximum of three pulses are sent over conductor 116 prior to the run end pulse, and the configuration of the last three circuits 144–1, 144–2, 144–3 of the output shift register after the run end pulse exactly represents the appropriate code word (the leftmost code digit being identical to the state of circuit 144–3, etc.)

For runs whose length is greater than 4, a more complicated sequence occurs. For all runs of 5 through 8, the code words are four bits long and the digit on the left is a 1 (see FIG. 8). Also, the second is an 0 and the two remaining digits (called the remainder) correspond to the contents of circuits 141–2 and 141–1.

Let it be assumed that a run-length of four has been registered by three time-2 pulses on conductor 116. If the run continues, the fourth time-2 pulse signals the presence of a run whose length is 5 or greater. This fourth pulse causes the return of circuits 141–1 and 142–2 to their left or "zero" states, and a carry output pulse is sent over conductor 171–1 which actuates circuit 141–3 to its "one" state. This carry pulse also actuates circuit 138–1 (FIG. 5) of the monitor register transferring it to its right side and enabling addressing gate 137–1. The pulse output of circuit 138–1 is applied over conductor 172–1 through "or" gate 135 to actuate circuit 133 into its lower state.

At time-3, a timing pulse on conductor 53 returns circuit 133 to its upper state, producing an output pulse on conductor 174 which sets circuits 134 into its lower state and which is also applied through gate 131 to conductor 145 to shift the output shift register one step. At time-4, a timing pulse on conductor 54 returns circuit 134 to its upper state and produces an output pulse on conductor 175 which is applied to all the addressing gates 137. Only gate 137–1 of this group is enabled and the pulse is sent through this gate, over conductor 176–1, through "or" gate 143–4, to actuate circuit 144–4 to its left or "one" state. Transfer gate 142–3 is still in a disabled condition because monitor register circuit 138–2 is still in its left state, causing the absence of an enabling potential on conductor 165–3. At this time (after the time-4 pulse following the fourth pulse on conductor 116), the output shift register has been shifted four times, a "one" has been entered into circuit 144–4, and a "zero" remains in circuit 144–3. If now a run end pulse is applied over conductor 164 at the following time-1 to indicate the termination of the run, the contents of circuits 141–2 and 141–1 are transferred in the above described manner to circuits 144–2 and 144–1, thereby completing the code word (1000) in the output shift register.

Following the fourth time-2 pulse on conductor 116 (and assuming a continuation of the run), no further action takes place in the circuits shown in FIGS. 5 and 6 except for the advancing of the run-length counter 141 at each time-2. When the run-length counter receives pulses representing run-lengths of 5, 9, 17, etc. (see FIG. 8) the address must be changed and this is done by sending a pulse over one of the conductors 171 to actuate one of the multivibrator circuits 138 in the monitor register. When the run-length changes from 4 to 5, the address pulse is sent over conductor 171–1. When the number changes from 8 to 9, the pulse is sent over conductor 171–2, and from 16 to 17, over conductor 171–3, etc.

The process of generating a code word with address and remainder continues as outlined above until the run ends and a run end pulse is generated (as previously described) in the circuit shown in FIGURE 4. This pulse is sent over conductor 164 at time-1 and is applied to all the transfer gates 142, some of which have been enabled by the application of D.C. voltages from the monitor register circuits 138 (over conductors 165) and by the application of D.C. voltages from the run-length counter circuits 141. The result of this pulse (at time-1) is the transfer of the coded number in the run-length counter 141 to the output shift register. At time-2, a pulse on conductor 127 (from circuit 122) resets all the multivibrator circuits in the monitor register 138 and the run-length counter 141 and also shifts the number in the output shift register 144 down one circuit. This last operation results from the pulse on conductor 127 passing through "or" gate 128 (FIG. 4), over conductor 130, through "or" gate 131, over conductor 145 to all the circuits 144 to cause their shifting as described above.

At time-3, a second shift of the output shift register is accomplished by means of the time-3 pulse on conductor 53 actuating circuit 123 (FIG. 4) whose output passes over conductor 148, through "and" gate 125, through "or" gate 128, through "or" gate 131, to conductor 145, and the circuits 144 as before.

At time-4, a third shift of the register is effected by the time-4 pulse on conductor 54 applied to circuit 124 and producing a pulse which travels over conductor 152, through gate 128, over conductor 130, and through gate 131 and conductor 145, as before.

At the end of this sequence of pulses, both the monitor register 138 and the run-length counter 141 have been reset. The first three circuits of the output shift register are empty and the circuits of FIGS. 5 and 6 are in a condition to accept a run-length count or a margin signal, whichever is sent from the circuit of FIG. 4.

From the above description it will be evident that the encoding circuit and the operating system of control and sensing circuits receives scanned information from an area of intelligence and encodes this information into voltage pulses representing information bits which furnish the length of run of each area of black or white and, in addition, transmit run end pulses and margin pulses. The final code, as presented to a transmission system, contains an address before each coded run-length, this address specifying in advance the number of information bits in the coded run-length, and serving to control and simplify the receiving and decoding circuits.

The circuits as shown are symbolic as to their action and the results produced. The circuits do not show intermediate amplifiers which may be necessary to amplify the pulses before application to the next series of multivibrator circuits or gates. The circuits also do not show any pulse regenerating circuits which may be necessary because of the degrading action of some of the circuits which may tend to destroy the sharp pulse wave form and may act to produce a time delay in the transmission of the pulses.

The foregoing disclosure and drawings are merely illustrative of the principles of this invention and are not to be interpreted in a limiting sense. The only limitations are to be determined from the scope of the appended claims.

What is claimed is:

1. An encoding circuit system comprising; an optical scanning means for sequentially scanning area elements of intelligence with a light-sensitive transducer for obtaining electrical signals indicating black and white areas; said scanning means also having separate means for generating pulses at a rate which is in excess of the area element scanning rate; an area element pulse generating means connected to the scanning means and including a plurality of bistable multivibrator means for converting the signals indicating the black and white areas into a plurality of count pulses and for generating a run end pulse when a change of shade is sensed by the scanning means; a sequential timing pulse generating means connected to said separate means of said scanning means which generates a plurality of sequential timing pulses and applies them respectively to a plurality of conductors connected to said area pulse generating means for controlling the count action therein; an electric coding circuit connected to said area pulse generating means and to said conductors for counting the area elements in each of the black and white areas scanned by the scanning means and for converting the count into coded information; an output shift register including a plurality of multivibrator circuit means connected to said coding circuit for accumulating the coded information; and an output storage means which receives the coded information from said shift register and retains it for use by a utilization circuit.

2. An encoding circuit system comprising; a means for scanning area elements of intelligence with a light-sensitive transducer for obtaining electrical pulses indicating black, white and margin areas; said scanning means also having separate means for generating pulses at a rate which is in excess of the area element scanning rate; circuit means for generating area element pulses connected to the scanning means and including a plurality of bistable multivibrator circuit means for converting the signals indicating the black, white and margin areas into count pulses and for generating a run end pulse which indicates a change of shade in the scanned area; an electric coding means connected to said area pulse generating means for counting the area elements in each of the black and white areas scanned by the scanning means and for converting the count into coded information; means for generating timing pulses connected to said area pulse generating means which generates a plurality of equally spaced timing pulses for controlling the count action of the area pulse generating means; an output shift register including a plurality of multivibrator circuit means connected to said coding means for accumulating the coded information; and an output storage means which receives the coded information from the shift register and retains it for use by a utilization means.

3. An encoding circuit system comprising; an optical scanning means for sequentially scanning area elements of intelligence with a light-sensitive transducer for obtaining electrical signals indicating black, white, and margin areas; said scanning means also having separate means for generating pulses at a rate which is in excess of the area element scanning rate; an electric encoding means connected to said scanning means for counting the area elements in each of the areas scanned and for converting the count into coded information; a timing pulse generating means connected to said encoding means and adapted to generate a plurality of sequential timing pulses for controlling the count action of said encoding means; said timing pulse generating means controlled by the electric pulses received from the separate means of said scanning means; a gate connected in series between the scanning means and the timing pulse generating means, said gate adapted to be enabled or disabled by a voltage pulse from an external source; a storage register connected to the encoding means therefor for receiving and storing encoded information; said storage register including counting means for generating an electric signal when the register is full of encoded information; connecting means for applying said electric signal to said gate to disable the gate and cut off said sequential timing pulses thereby interrupting the action of the encoding means.

4. An encoding circuit system as set forth in claim 3 wherein a first counter means is connected to said scanning means for counting all the area element pulses sent therefrom and counting in synchronism with the scanning means.

5. An encoding circuit system as set forth in claim 4 wherein a second counter means is connected to said scanning means in series with a gate, said gate being connected to said encoding means and being disabled by an electric pulse from said encoding means when the operation of the encoding means stops.

6. An encoding circuit system as set forth in claim 5 wherein each of said first and second counter means include a plurality of multivibrator counting stages and there is provided a comparator circuit which has a plurality of comparator stages equal to the number of counting stages in the first and second counter means with each comparator stage being separately connected to one of the counting stages in each counter means, said comparator circuit being connected to the gate disposed in series with the timing pulse generating means.

7. An encoding circuit system as set forth in claim 6 wherein said comparator circuit is connected to the storage register whereby said comparator circuit is enabled to send an enabling signal to the gate when said storage register is empty.

8. An encoding circuit system as set forth in claim 4 wherein the output side of a multivibrator circuit means is connected to said first counter means, the output side of said multivibrator circuit means being connected to said encoding means, whereby said first counter means is enabled to send an operating pulse to the encoding means when the first counter means is full so as to denote the start of a margin.

9. An encoding circuit as claimed in claim 8 wherein there is provided a holding gate between the scanning means and the timing pulse generating means, an auxiliary pulse source being also connected to said holding gate and to the separate means of said scanning means which is employed to generate an inhibit signal for said auxiliary pulse source.

10. An encoding circuit as claimed in claim 9 wherein counter means are connected to said scanning means for indicating the termination of a scanned line and the start of a margin area.

References Cited in the file of this patent

UNITED STATES PATENTS

| | | |
|---|---|---|
| 2,725,425 | Sziklai | Nov. 29, 1955 |
| 2,784,256 | Cherry | Mar. 5, 1957 |
| 2,834,005 | Ketchledge | May 6, 1958 |
| 2,850,574 | Kretzmer | Sept. 2, 1958 |
| 2,945,221 | Hinton | July 12, 1960 |
| 2,946,851 | Kretzmer | July 26, 1960 |
| 2,957,941 | Covely | Oct. 25, 1960 |
| 2,974,195 | Julesz | Mar. 7, 1961 |